US006295583B1

(12) United States Patent
Razdan et al.

(10) Patent No.: US 6,295,583 B1
(45) Date of Patent: Sep. 25, 2001

(54) METHOD AND APPARATUS FOR RESOLVING PROBES IN MULTI-PROCESSOR SYSTEMS WHICH DO NOT USE EXTERNAL DUPLICATE TAGS FOR PROBE FILTERING

(75) Inventors: Rahul Razdan, Princeton; Solomon J. Katzman; James B. Keller, both of Waltham; Richard E. Kessler, Shrewsbury, all of MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/099,400

(22) Filed: Jun. 18, 1998

(51) Int. Cl.$^7$ ..................................................... G06F 12/00
(52) U.S. Cl. ......................... 711/137; 711/146; 711/167; 711/213
(58) Field of Search ................................. 711/137, 213, 711/216, 143, 146, 128, 100, 167

(56) References Cited

U.S. PATENT DOCUMENTS 5,119,485 * 6/1992 Ledbetter, Jr. et al. ............. 711/146
5,717,892 * 2/1998 Oldfield ................................ 711/128
5,751,994 * 5/1998 Weisser et al. ...................... 711/137
5,809,537 * 9/1998 Itskin et al. .......................... 711/146
5,860,081 * 1/1999 Herring et al. ...................... 711/100

* cited by examiner

Primary Examiner—Matthew Kim
Assistant Examiner—Brian R. Peugh
(74) Attorney, Agent, or Firm—Conley, Rose & Tayon, P.C.

(57) ABSTRACT

A processor of a multiprocessor system is configured to transmit a full probe to a cache associated with the processor to transfer data from the stored data of the cache. The data corresponding to the full probe is transferred during a time period. A first tag-only probe is also transmitted to the cache during the same time period to determine if the data corresponding to the tag-only probe is part of the stored data stored in the cache. A stream of probes accesses the cache in two stages. The cache is composed of a tag structure and a data structure. In the first stage, a probe is designated a tag-only probe and accesses the tag structure, but not the data structure, to determine tag information indicating a hit or a miss. In the second stage, if the probe returns tag information indicating a cache hit the probe is designated to be a full probe and accesses the data structure of the cache. If the probe returns tag information indicating a cache miss the probe does not proceed to the second stage.

9 Claims, 7 Drawing Sheets

METHOD AND APPARATUS FOR RESOLVING PROBES IN MULTI-PROCESSOR SYSTEMS WHICH DO NOT USE EXTERNAL DUPLICATE TAGS FOR PROBE FILTERING

CROSS-REFERENCE TO RELATED APPLICATIONS

This Application relates to the applications entitled:
METHOD AND APPARATUS FOR PERFORMING SPECULATIVE MEMORY REFERENCES TO THE MEMORY INTERFACE (U.S. application Ser. No. 09/099,399, filed Jun. 18, 1998, now abandoned) and
METHOD AND APPARATUS FOR MINIMIZING PIN-COUNT NEEDED BY EXTERNAL MEMORY CONTROL CHIP FOR MULTIPROCESSORS WITH LIMITED MEMORY SIZE REQUIREMENTS (U.S. application Ser. No. 09/099,396, filed Jun. 18, 1998, now U.S. Pat. No. 6,199,153) and
METHOD AND APPARATUS FOR PERFORMING SPECULATIVE MEMORY FILLS INTO A MICROPROCESSOR (U.S. application Ser. No. 09/099,396, filed Jun. 18, 1998, now abandoned) and
METHOD AND APPARATUS FOR DEVELOPING MULTIPROCESSOR CACHE CONTROL PROTOCOLS USING ATOMIC PROBE COMMANDS AND SYSTEM DATA CONTROL RESPONSE COMMANDS (U.S. application Ser. No. 09/099,398, filed Jun. 18, 1998) and
METHOD AND APPARATUS FOR DEVELOPING MULTIPROCESSOR CACHE CONTROL PROTOCOLS USING AN EXTERNAL ACKNOWLEDGMENT SIGNAL TO SET A CACHE TO A DIRTY STATE (U.S. application Ser. No. 09/099,384, filed Jun. 18, 1998) and
METHOD AND APPARATUS FOR DEVELOPING MULTIPROCESSOR CACHE CONTROL PROTOCOLS BY PRESENTING A CLEAN VICTIM SIGNAL TO AN EXTERNAL SYSTEM (U.S. application Ser. No. 09/099,304, filed Jun. 18, 1998) and
METHOD AND APPARATUS FOR DEVELOPING MULTIPROCESSOR CACHE CONTROL PROTOCOLS USING A MEMORY MANAGEMENT SYSTEM GENERATING ATOMIC PROBE COMMANDS AND SYSTEM DATA CONTROL RESPONSE COMMANDS (U.S. application Ser. No. 09/099,385, filed Jun. 18, 1998) and
METHOD AND APPARATUS FOR DEVELOPING MULTIPROCESSOR CACHE CONTROL PROTOCOLS USING A MEMORY MANAGEMENT SYSTEM GENERATING AN EXTERNAL ACKNOWLEDGMENT SIGNAL TO SET A CACHE TO A DIRTY COHERENCE STATE (U.S. application Ser. No. 09/099,386, filed Jun. 18, 1998) and
METHOD AND APPARATUS FOR DEVELOPING MULTIPROCESSOR CACHE CONTROL PROTOCOLS USING A MEMORY MANAGEMENT SYSTEM TO RECEIVE A CLEAN VICTIM SIGNAL (U.S. application Ser. No. 09/099,387, filed Jun. 18, 1998).

These applications are filed simultaneously herewith in the U.S. Patent & Trademark Office.

TECHNICAL FIELD

The present invention relates generally to computer processor technology, and more particularly to memory subsystems for a multiprocessor system.

BACKGROUND ART

One popular multiprocessor computer architecture is formed by coupling one or more processors to a shared main memory storing data, with each processor typically having a local cache to store its own private copy of a subset of the data from the main memory.

In the above architecture, a separate memory control chip connecting the processors to the main memory manages the operations necessary to access memory from any one of the processor caches and the main memory. It is typically the responsibility of the memory control chip to maintain a coherent view of the memory by checking an address reference generated by a processor. To perform this function, the memory control chip issues a probe reference to the other processor caches to see if a copy of the data exists in any of these other caches.

Each processor of the multiprocessor system must be able to service probe references to its cache as well as its own internally generated references to the cache. From the processor's point of view, these probe references consume cache bandwidth which could have been used for the processor's internal references. The impact of this degradation of bandwidth may affect the performance of the system.

In the prior art, one solution to minimize the impact of this degradation has been to maintain an external duplicate copy of the tags of the processor cache. This way, the probe request can reference the address of the tags to determine whether a probe response is a hit or a miss. Only if the probe response results in a cache hit, is the probe response sent to the data memory portion of the cache to access the data. Since probe responses typically result in cache misses, the external tags improve the performance of the system.

However, a multiprocessor system with duplicate external tags has some disadvantages. The system must provide the external tags for each processor along with the associated additional logic. In addition, since the external tags must maintain coherence with the processor's cache, logic must be provided which updates the state of the external tags to reflect any changes to the cache. This additional computation and bandwidth requirement leads to degradation in system performance.

Therefore, a technique is desired which resolves probe references in multiprocessor systems without using external duplicate tags.

SUMMARY DISCLOSURE OF THE INVENTION

The present invention overcomes the foregoing and other problems with a computing apparatus and method for resolving probes in a multiprocessor system without using external duplicate tags for probe filtering.

The computing apparatus of the present invention includes a clock, a cache, an input stream, a selector, and a multiplexer. The cache includes a tag structure and a data structure which both produce data in response to a probe. Preferably, the tag structure is implemented with static random access memory and the data structure is implemented with static random access memory capable of transferring data in a burst mode.

The tag structure in response to the probe transfers tag information in a clock cycle. The tag information includes information on whether the probe resulted in a cache hit or a cache miss. The data structure in response to the probe transfers data during multiple clock cycles of the clock.

An input stream accepts probes directed to the cache. The selector then designates each one of the plurality of probes in the input stream to be either a full probe or a tag-only probe. The multiplexer then accesses the data structure with one of the probes designated a full probe to transfer data during the multiple clocks cycles, and the multiplexer further accesses the tag structure with one or more of the probes designated tag-only probes during the multiple clock cycles. Each one of the designated tag-only probes accesses the tag structure to transfer tag information during a respective one of the multiple clock cycles.

In another aspect of the present invention, a processor is configured to transmit a full probe to the cache to transfer data from the stored data of the cache. The data corresponding to the full probe is transferable during a time period, which as discussed above could be multiple clock cycles. A tag-only probe is also transmitted to the cache during the same time period to determine if the data corresponding to the tag-only probe is part of the data stored in the cache.

In a further aspect of the present invention, a probe from the input stream accesses the cache in two stages. In the first stage, the selector designates the probe to be a tag-only probe and the multiplexer accesses the tag structure with the probe. If the probe returns tag information indicating a cache hit, the selector, in the second stage, designates the probe to be a full probe. The multiplexer then accesses the data structure with the probe. If the probe returns tag information indicating a cache miss the probe does not proceed to the second stage.

Another aspect of the present invention includes a probe queue for storing probes. The selector designates the probe from the input stream in two stages. In the first stage the selector designates the probe from the input stream to be a tag-only probe. If the probe in response to an access to the tag structure returns tag information indicating a cache hit, the probe is put on a probe queue. In the second stage the selector further designates a probe from the probe queue to be a full probe so that the multiplexer accesses the data structure with the probe.

Preferably, the cache in response to the full probe transfers tag information from the teg-structure during the first clock cycle of the multiple cycles and transfers the data from the data-structure during the multiple cycles.

Advantageously, the selector designates one probe in the input stream to be a full probe and three probes in the input stream to be tag-only probes. The multiplexer is configured to access the data structure corresponding to a full probe to transfer data during four clocks cycles. The multiplexer is further configured to access the tag structure in each clock cycle of the multiple clock cycles. In this regard, a respective one the tag-only probes is used to access the tag structure during three of the four clock cycles.

A tag bus may be provided to receive a tag stream of tag information from the tag structure in response to the corresponding plurality of probes received from the input stream. A probe history counter has values 0 through 3. The probe history counter is set to the value of 3 upon detecting a cache hit from the tag stream. The probe history counter is decremented by 1 upon detecting a miss from the tag stream and if a miss is detected while the probe history counter has value 0 then the probe history counter remains at 0. The selector then selects a probe to be a tag-only probe if the probe history counter is 0 and a full probe if the probe history counter is other than 0.

In accordance with other aspects of the present invention, a type unit is configured to determine a probe type for one of the probes in the input stream. The probe type determination may be based on characteristics of the probe. The selector is configured to determine whether to designate the probe as either a full probe or a tag-only probe based on the probe type determination.

The type unit may, if desired, he configured to determine if a probe type for one of the probes in the input stream is an I/O DMA probe. If so, the selector designates an I/O DMA probe to be a full probe.

A further feature includes accessing a cache with a full probe to transfer first data corresponding to the full probe from the cache during a time period and accessing the same cache with a tag-only probe during the same time period to determine during that time period if data corresponding to the tag-only probe is stored in the cache.

A multiprocessor system, in accordance with the present invention, includes a main memory, a memory controller, and a plurality of processors. The main memory is configured to store information. The memory controller is coupled to the main memory and the plurality of processors.

A first one of the processors is configured to transmit a full probe to the cache to transfer data from the stored data of the cache. The data corresponding to the full probe is transferable during a time period. A first tag-only probe is also transmitted to the first processor to the cache during the same time period to determine if the data corresponding to the tag-only probe is part of the stored data stored in the cache. Preferably, the time period is multiple cycles of a clock.

A second of the processors sends a memory reference to the memory controller. The memory reference includes an address to the main memory. The memory controller generates a probe to the first processor corresponding to the memory reference.

Objectives, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

BEST MODE FOR CARRYING OUT THE INVENTION

Figure 1:
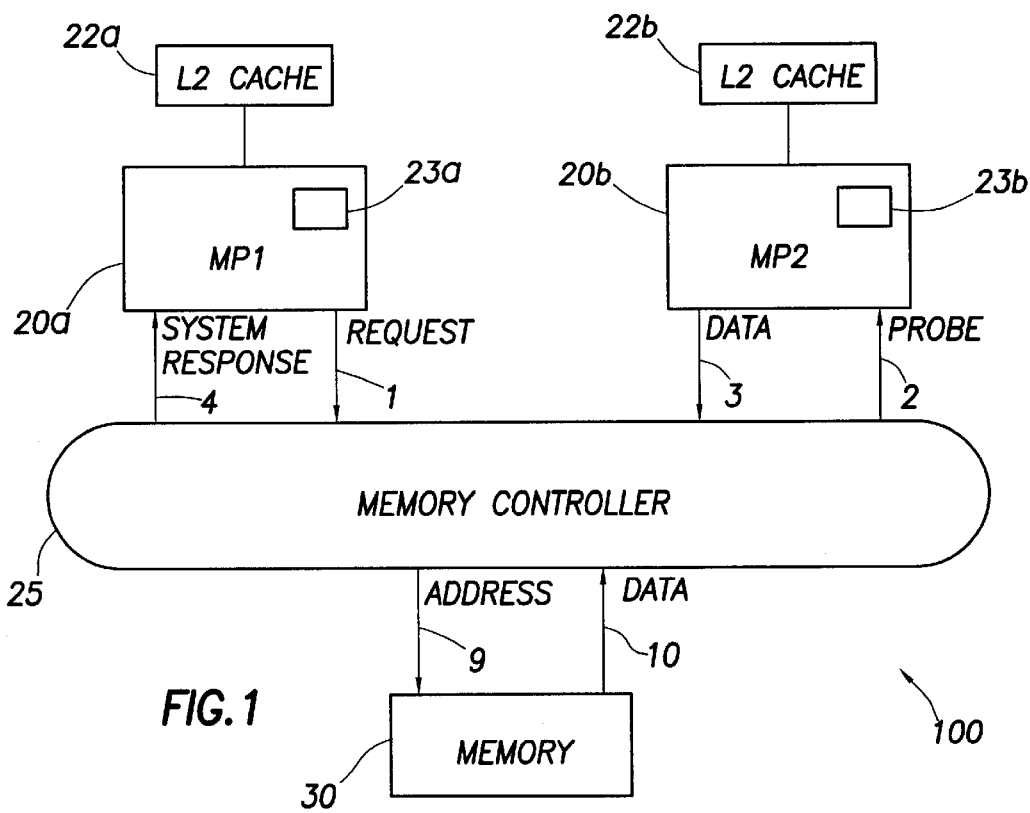
FIG. 1 is a multiprocessor shared memory system in accordance with the present invention.

FIG. 1 illustrates a multiprocessor system 100 which includes two or more processors 20, a memory controller 25 and a main memory 30. In the preferred embodiment, the processors 20 are microprocessors. In FIG. 1, two processors MP 20a and MP2 20b are shown for the purpose of illustration, but such a multiprocessor system may have two or more processors. In the preferred embodiment, a processor 20 may have more than one cache, including separate caches for instructions (not shown) and data. A cache may further be distinguished as being on the same chip (L1 cache) as the processor or externally connected to the processor chip via a cache bus (L2 cache). FIG. 1 shows processor 20a coupled to L1 cache 22a and containing internal Li cache 23a. Processor 20b is coupled to external cache 22b and contains internal L1 cache 23b.

Preferably, the main memory 30 is a group of main memory chips holding memory shared by the processors of the multiprocessor system 25. The memory 30 forms a common address space referenced by the processors 20.

The memory controller 25 contain, data and address buses for coupling the microprocessors and memory, as well as additional logic for implementing a coherence protocol for assuring the coherency of data distributed throughout the main memory 30 and caches 22 and 23. The memory controller 25 implements a particular cache coherence protocol chosen by a system designer ior the multiprocessor system. The memory controller 25 may range in complexity from simple to complex depending on the particular protocol implemented. The memory controller 25 could be a single bus or switch system connecting the processors to main memory with additional logic added to implement the protocol. The memory controller could, for example, have its own processor and additional data structures needed to implement a directory cache protocol. Cache protocols, such as the directory cache protocol, are well known to one of ordinary skill in the computing arts.

In one possible implementation of a multiprocessor cache control protocol according to the present invention, in a typical memory access sequence, microprocessor 20a makes a memory request 1 to memory controller 25 requesting a block of memory from main memory 30. The memory controller 25 converts memory request 1 into a probe 2 and sends probe 2 to each microprocessor 20b to determine whether the memory block is present in one of the caches. In this example, the memory block is in cache 22b or 23b of microprocessor 20b, and thus microprocessor 20b issues a probe response 3 returning the block of data 3 to the memory controller 25. The memory controller 25 then forms a system response 4 sending the block to microprocessor 20a which originally requested it. Alternately, if the block was not present in any of the caches, the memory controller 25 would retrieve the memory block 10 corresponding to address 9 from main memory 30 and transfers it by the system response 4 to the requesting microprocessor 20a. Thus, in this particular protocol, before the system 25 checks the main memory 30, it first checks the memory from each cache of the other processors to make sure that the request gets the latest copy.

Figure 2:
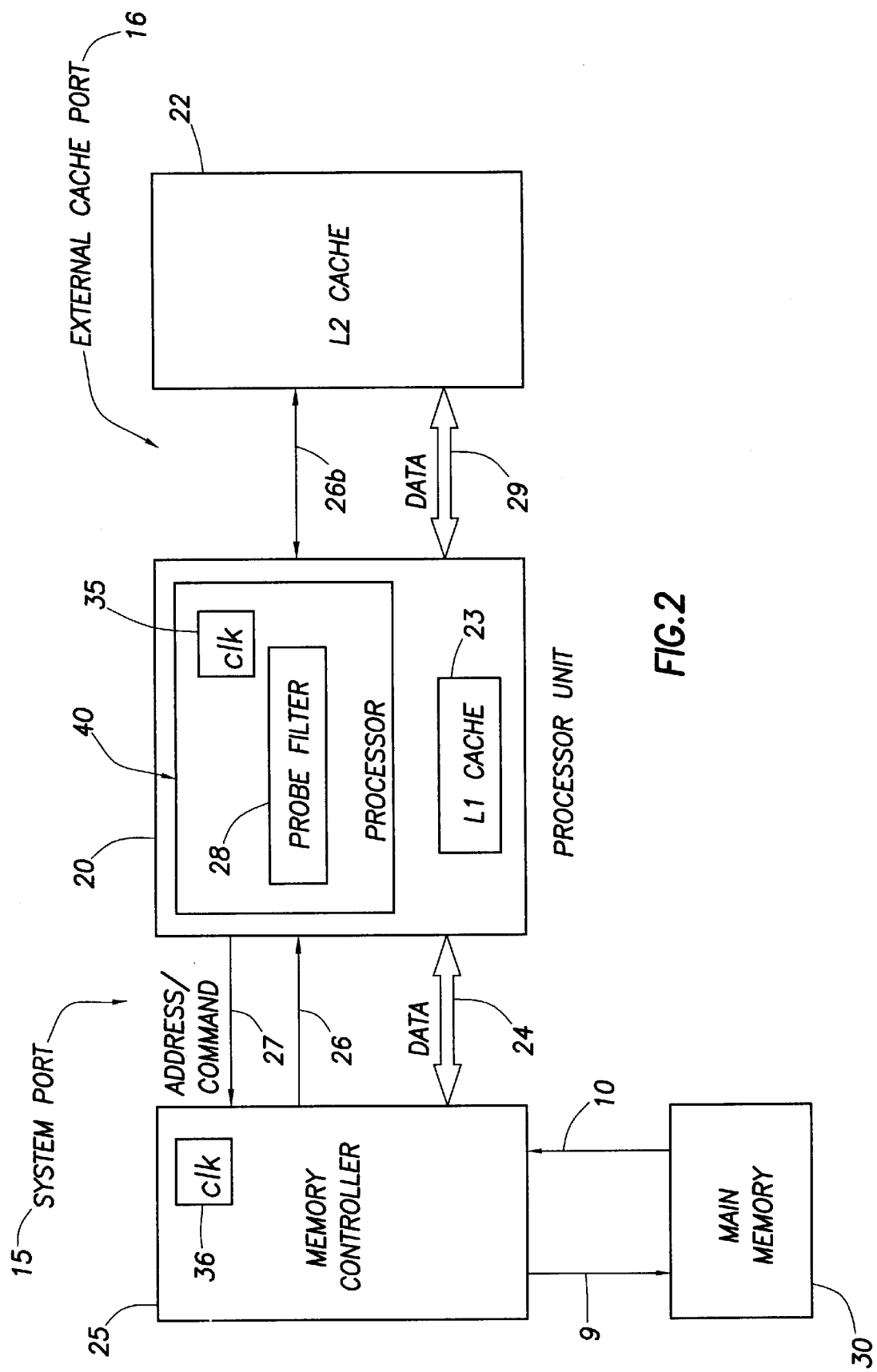
FIG. 2 is a block diagram of a computer system with an L1 and L2 cache in accordance with the present invention.

FIG. 2 shows a computer system having a processor unit (or microprocessor) 20, a memory controller 25, a main memory 30, and an L2 cache 22. The processor unit 20 transmits and receives information from memory controller 25 via system port 15. System port 15 includes a unidirectional address/command bus 26 for transmitting address and command information from the memory controller 25 to the processor unit 20, an address/command bus 27 for transmitting address and command information from the processor unit 20 to the memory controller 25, and a bi-directional data bus 24 for transporting data between the two systems. Generally, the system port 15 may interface with any external system, that is, any system linking the processor unit 20 to external devices, such as input/output devices. The memory controller 25 is an external system which manages memory in a uniprocessor or multiprocessor system.

The processor unit 20 transmits and receives information from an external L2 cache 22 via the external cache port 16. The external cache port 16 includes an address bus 26b and a data bus 29.

The external cache port 16 connects the processor unit 20 to an external cache 22, commonly referred to as the L2 cache. The external cache port 16 includes bidirectional data bus 29 and an address bus 26b. Processor unit 20 contains a processor 40 coupled to an L1 cache 23. In a preferred embodiment, processor 40 and L1 cache 23 are embedded on the same processor chip (denoted herein as processor unit 20), and the L2 cache 22 is a separate chip or chips located externally to the processor chip and connected to the processor chip through cache port 16.

The system port 15 is composed of a bidirectional data bus 24 and two address/command buses 26 and 27. The address/command buses 26, 27 transmits both command and address information between the memory controller 25 and the processor unit 20. The command and address information is time multiplexed onto the address/command buses in order to reduce pin count on the processor chip.

The memory controller 25 interfaces the processor unit 20 to the main memory 30. The memory controller 25 references main memory 30 via an address bus 9 and receives data from main memory via a data bus 10.

Memory controller 25 has an external data clock 36 which runs data over the data port 24 at clock rate R. Processor unit 20 has an internal clock 35 which runs the internal system at clock rate S. In the present embodiment, the clock rates R and S are not identical. The processor unit's internal clock rate S is 1.5 times faster than the memory controller's external data clock rate R.

When the processor unit 20 desires to access main memory 30 to retrieve data, the processor 20 generates an external memory reference in the form of a probe command to the memory controller 25 through the address/command bus 27. The external memory reference typically includes a five bit command opcode specifying the type of memory reference and an address pointing to a location in memory. The memory controller 25 handles the command by transmitting the address via the address bus 9 and retrieving the data from main memory 30 over the data bus 10. The memory controller 25 then transmits the data to the processor 20 on the data bus 24.

Figure 3:
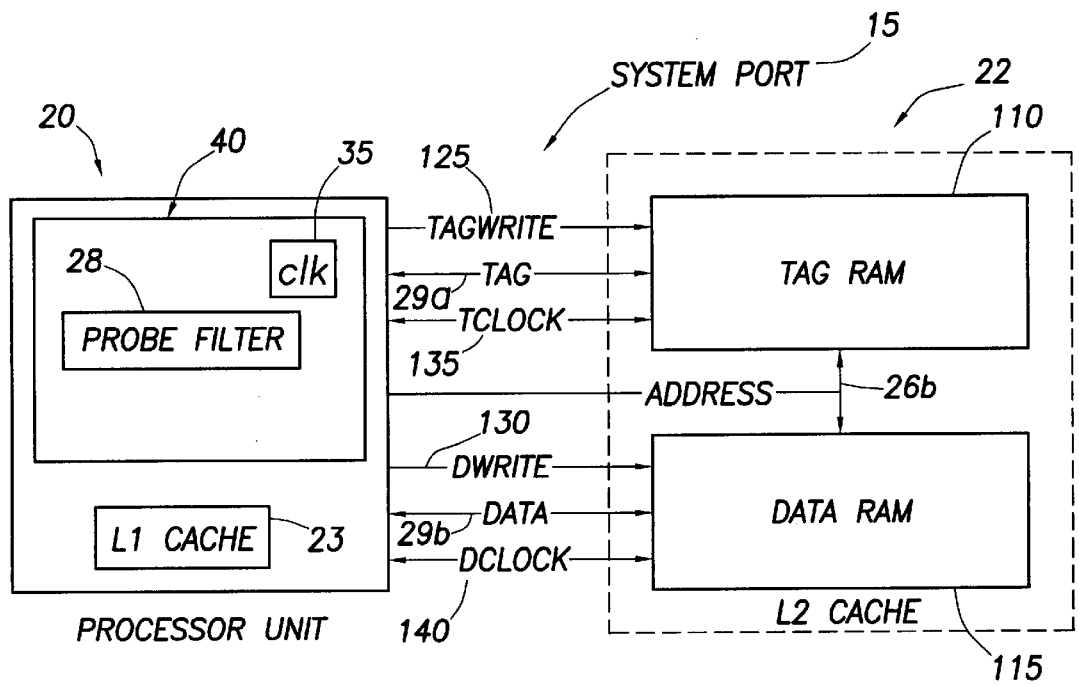
FIG. 3 is a block diagram of processor with a cache according to the present invention.

FIG. 3 discloses further components of the system port 15 of the processor 20 of FIG. 2, including the bus 29, which includes a tag bus 29a and data bus 29b, and the cache 22 which includes tag RAMS 110 and data RAMS 115. Tag Bus 29a provides a 4 byte data path for tag data between processor unit 20 and tag RAM 110. Data bus 29b provides a 128 bit (i.e., 16 bytes) wide data path between the processor unit 20 and the data RAM 115. The tag RAM 110 and data RAM 115 form the structure of the L2 cache 22.

A block of tag RAM 110 will contain bits for an upper level address identifying the corresponding block in the data RAM, and may also contain several bits indicating the state of the cache block, including a coherency state.

To access the information in either the tag RAM 110 or data RAM 115, the processor 20 sends an address on the address bus 26b which addresses both the location in the tag RAM and the location in the data RAM associated with that address.

In response to a TagWrite signal 125 issued by the processor and the address on the address bus 26b, the tag RAM 110 returns four bytes of data during the a single clock cycle of Tclock 135. The tag data indicates whether there was a cache hit, i.e., the data block for the associated address is in the data cache, or, alternatively, a cache miss, i.e., the data block is not in the cache.

In response to a Dwrite signal 135 issued by the processor and the address on the address bus 26b, the data RAM 115 returns a 64 byte block of data over the 16 byte wide data bus 110 in four consecutive time cycles with 16 bytes being transferred every clock cycle as indicated by Dclock signal 140. Typically, to implement this behavior requires the RAM chips to be burst RAMS.

The Dwrite signal 130 and the TagWrite signal 125 are selectable independently. Furthermore, the Tag bus 29a and Data bus 29b are implemented as separate physical buses. Consequently, by selecting both TagWrite and DWrite for a single address, the tag information may be selected from the TAG RAM and simultaneously the data selected from the data RAM. Alternately, the tag RAM may be selected without selecting the data RAM, or the Data RAM may be selected without selecting the tag RAM.

Figure 4:
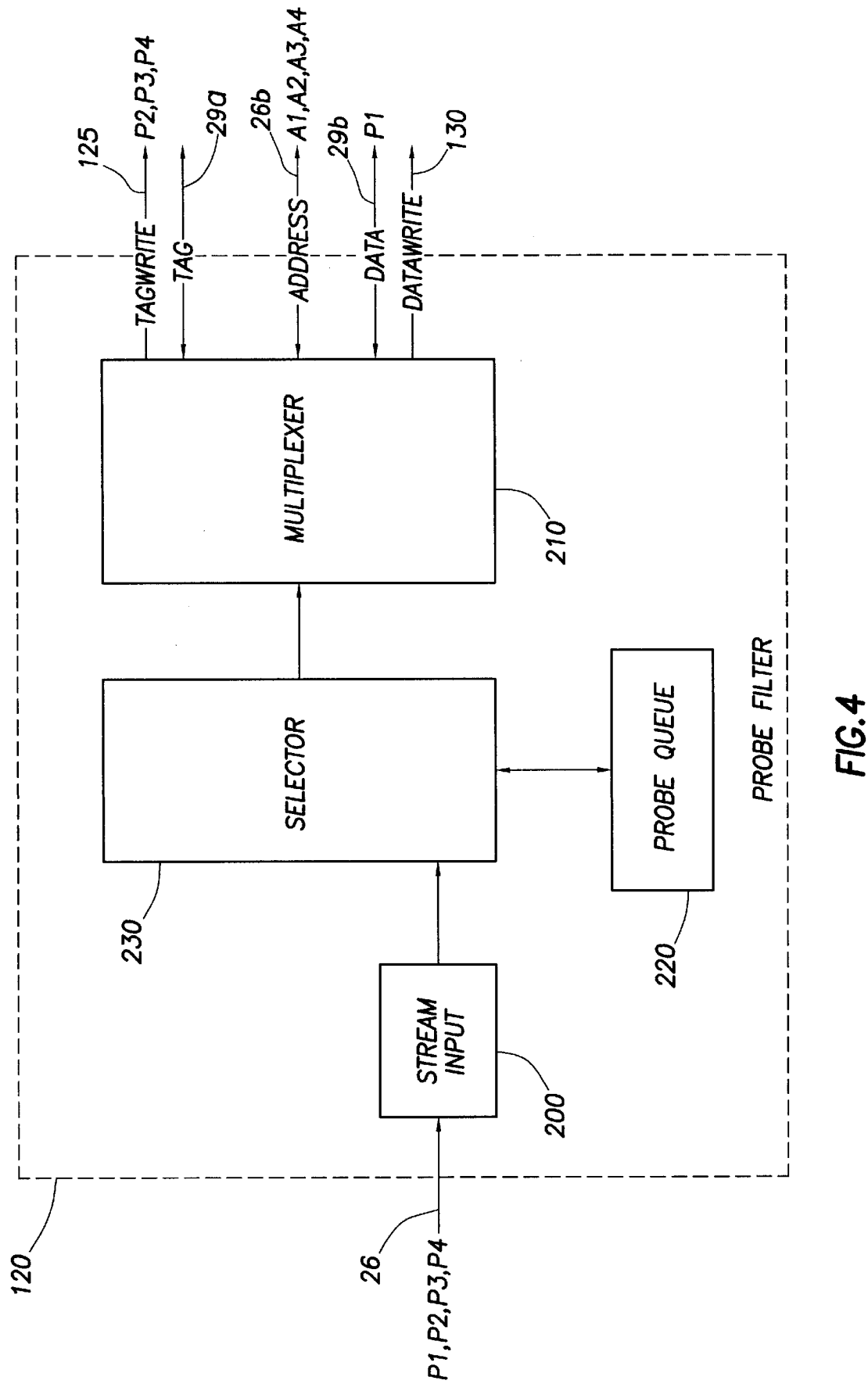
FIG. 4 discloses a first embodiment of the probe filter according to the present invention.

FIG. 4 illustrates a probe filter 120 according to the present invention including an input stream 200, a selector 230, a multiplexer 210 and a probe queue 220.

The input stream 200 represents circuitry which accepts a plurality of probe references received from the memory controller 25 via the address/command bus 26. An example of four probe references, i.e., P1, P2, P3, and P4 at the input stream 200 is illustrated in FIG. 4. A probe reference received from the address bus 26 includes an address for referencing cache 22.

The selector 230 includes circuitry for deciding the probe type for each probe received from the stream input 200. Typically, the selector 230 decides whether one of the probes from stream input 200 is to be a full probe or a tag-only probe. The selector may decide a probe type for the probe, i.e. full-probe or tag-only probe, based on criteria, such as a priori characteristics of the incoming probe, or on information gathered on the probe later, such as whether the probe results in a cache hit or miss. The selector may also decide on some other basis, such as an automatic pattern, i.e. pick the first to be a full-probe and the next three to be a tag-only probe.

The multiplexer 210 receives probes from the input stream 200 and the type of the probe, whether tag-type or full-type, from the selector 230. The multiplexer 210 provides circuitry permitting the access of the tag RAMS by up to three tag-only probes simultaneously with the access of data from the data RAMS of a full-probe. The full-probe transfers a 64 byte block of data over the 16 byte data bus 29b from the burst data RAMS in four clock cycles. The full-probe also transfers tag information from the tag RAMS 110 over the tag bus 29a in one cycle. A tag-only probe transfers data from the tag RAMS 110 over the Tag bus 29a in one clock cycle.

Figure 5:
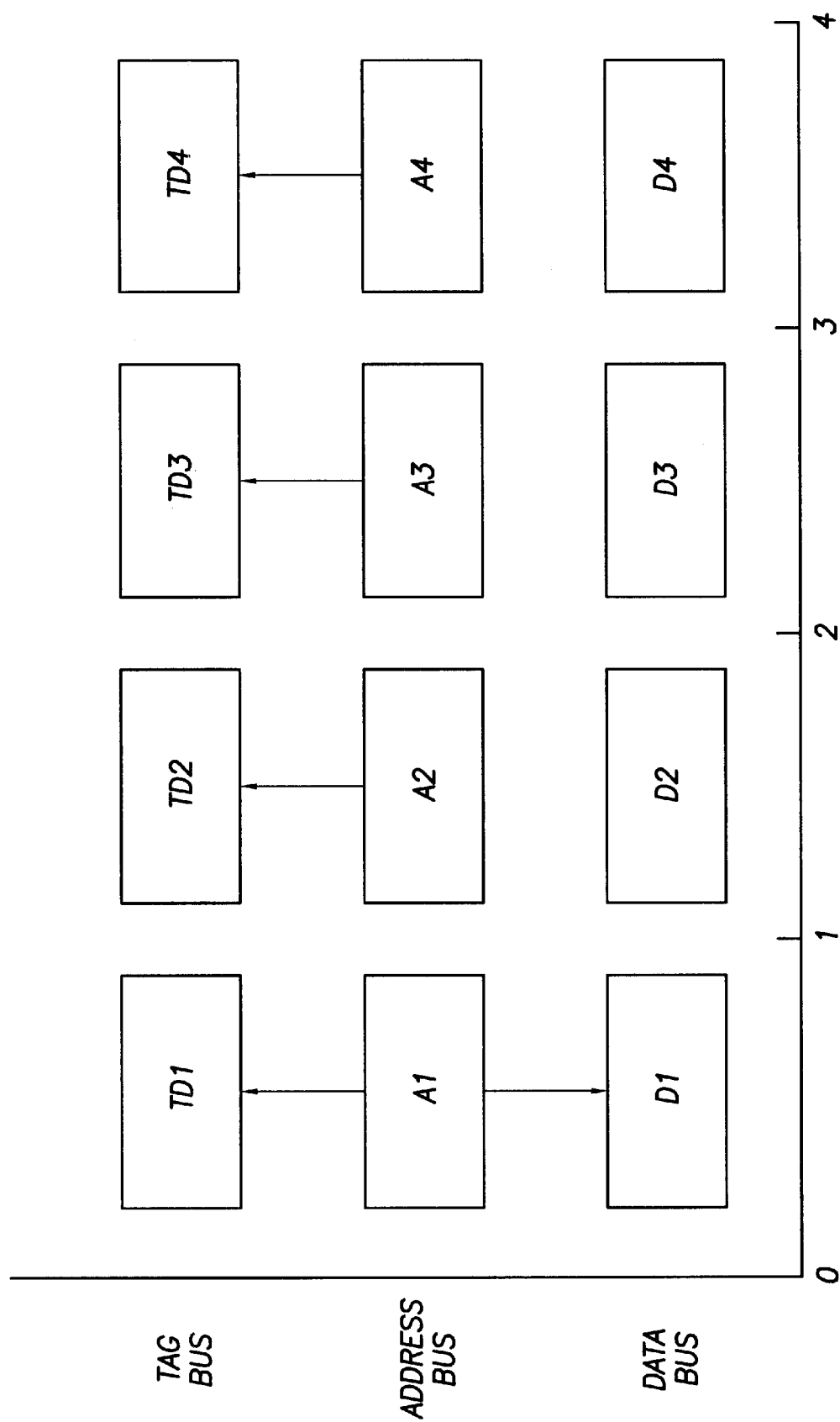
FIG. 5 is a timing diagram illustrating parallel memory access to the tag RAMS and data RAMS according to the present invention.

In FIG. 5, a timing diagram illustrates the output behavior of multiplexer 210 during four time cycles. Shown are probe references P1, P2, P3, and P4 with corresponding addresses A1, A2, A3, and A4. In this example, the selector 230 has previously selected four probes from the input stream 200, including probe P1 designated by the selector to be a full-probe and probes P2, P3, and P4 designated by the selector to be tag-only probes.

The multiplexer 210 schedules probe P1 during cycle 1 as a full probe having corresponding address A1. In response to address A1 transmitted on the address bus 26b during the same cycle the tag RAM returns tag information TD1 on the tag bus 29a and simultaneously the first 16 byte data block D1 on the data bus 29b. In response to the same address A1 put on the address bus 26b on cycle 1, the burst DRAM outputs the remaining 16 byte data blocks D2 though D4 over the data bus 29b.

The multiplexer 210, concurrent with the transmission of data during time cycles 2–4, schedules probes P2 through P4 during time cycles 2–4. In response to addresses A2–A4 transmitted on the address bus 26b during cycles 2–4 the tag RAM returns tag information TD2–TD4 or. the tag bus 29a.

The tag RAM 110 outputs tag information on the tag bus 29a, including information indicating whether the address of the probe is in the cache, i.e. whether there is a cache hit or a cache miss.

The probe queue 220 holds probes for which the tag information on the tag bus 29a indicates the probe is a cache hit. The process of resolving a probe reference is a two stage process. During the first stage, the selector selects the probe from the input stream 200 to be a tag-only probe which returns tag information indicating whether the data is present in the data RAMS, i.e. a cache hit, or, alternatively, the data is not present in the data RAMS, i.e. a cache miss. In the second, stage, if the tag information indicates a cache hit, then the probe may be put on a probe queue where at some designated time it is reselected from the probe queue to be a full-probe which returns the data from the cache on the data bus. If the tag information indicates a tag miss, then the probe need not go onto the second stage and the status of the cache block may be reported to the memory controller.

Figure 6:
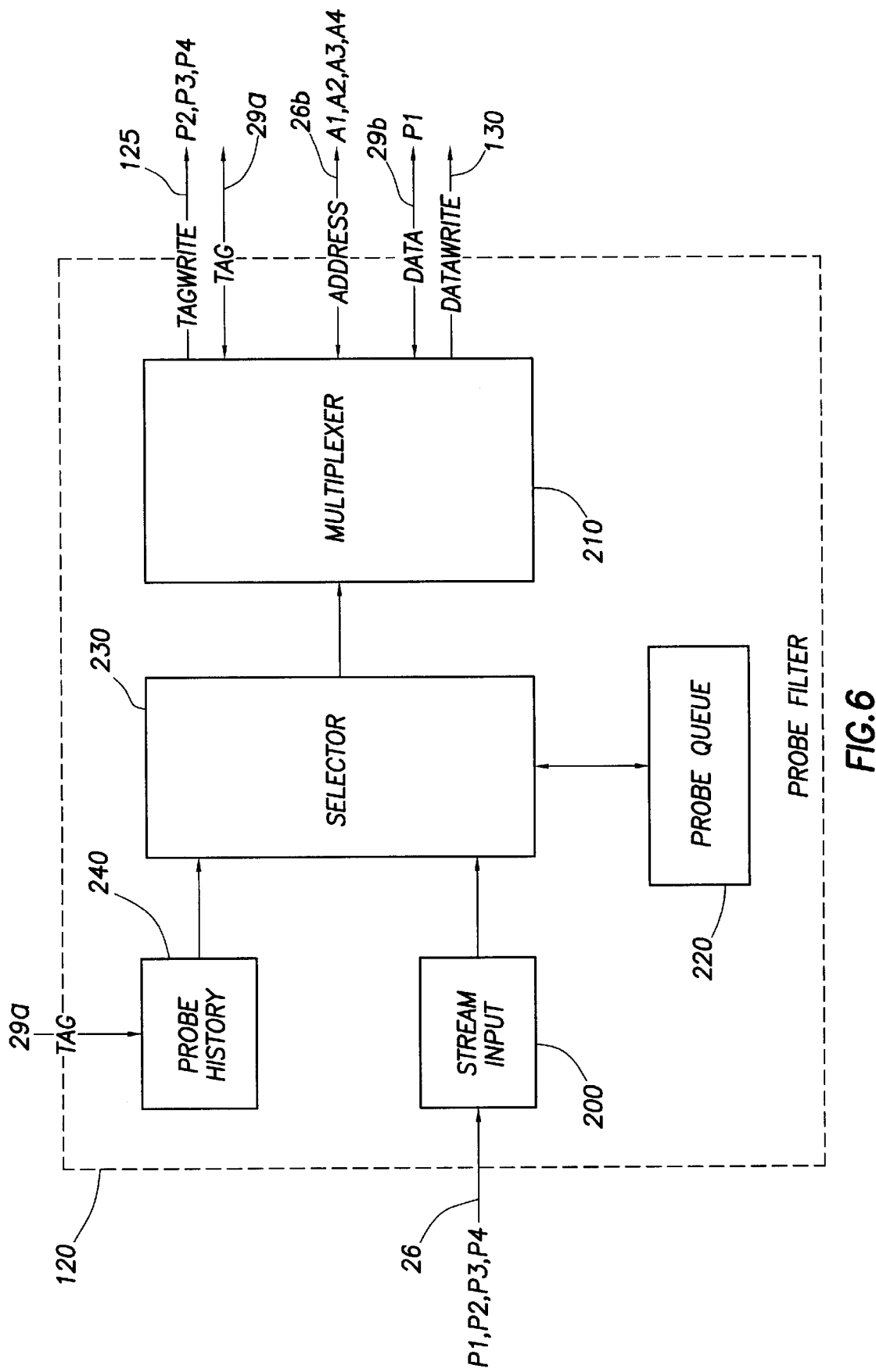
FIG. 6 discloses a second embodiment of the probe filter according to the present invention.

FIG. 6 shows a second embodiment of the probe filter 120 of FIG. 4 with the addition of a probe history 240. The probe history 240 is a mechanism providing the selector 230 with information related to the tag information.

The probe history 240 is a counter having values from 0 through 3. The probe history 240 receives tag information from the tag bus 29a, in particular, information indicating whether a probe reference produced a cache hit or a cache miss. A cache hit occurs when the address is located in the tag RAM indicating the data is in the cache. A cache miss occurs when the address in not located in the tag RAM.

The probe history counter 240 is initially set to the value of 3. Every time a miss is detected from the tag information, the probe history is decremented by 1. If the value of the probe history is 0 then, for every succeeding probe miss, the counter remains at zero.

The selector 230 selects a probe to be a tag-only probe if the counter is 0 and a full probe hf the counter is not 0.

The embodiment of the probe filter depicted in FIG. 6 solves the problem of latency and bandwidth loss in the case where the stream input 200 consists of a series of probe hits. Typically, most of the probe responses of the input stream 200 will be probe misses. Thus, a typical stream pattern will consist of probe misses interspersed with probe hits. However, it is possible to have a streaming probe hit situation, where a series of consecutive probe hits cluster together. As has been described, for the case of a probe hit, the probe must be scheduled again to access the data RAMS. Thus, if there is a cluster of probe hits, this will result in a cost of additional latency because the two stage probe access process takes longer and bandwidth because each probe takes two searches. However, the probe history of the present invention reduces the latency and bandwidth penalty by switching to a mode of temporarily selecting full probes until the cluster of probe hits have been processed. When a probe hit is detected, the counter is set to three and only decrements upon receiving a probe miss. When the counter is nonzero, the selector will select all input probes to be full probes. Thus, the probe history switches the probe filter to a mode of executing each probe in the filter as a full probe. When the data stream reverts to all misses, the counter will decrement to zero and stay there. When the probe history is equal to zero, the selector will than revert to issuing tag-only probes.

Figure 7:
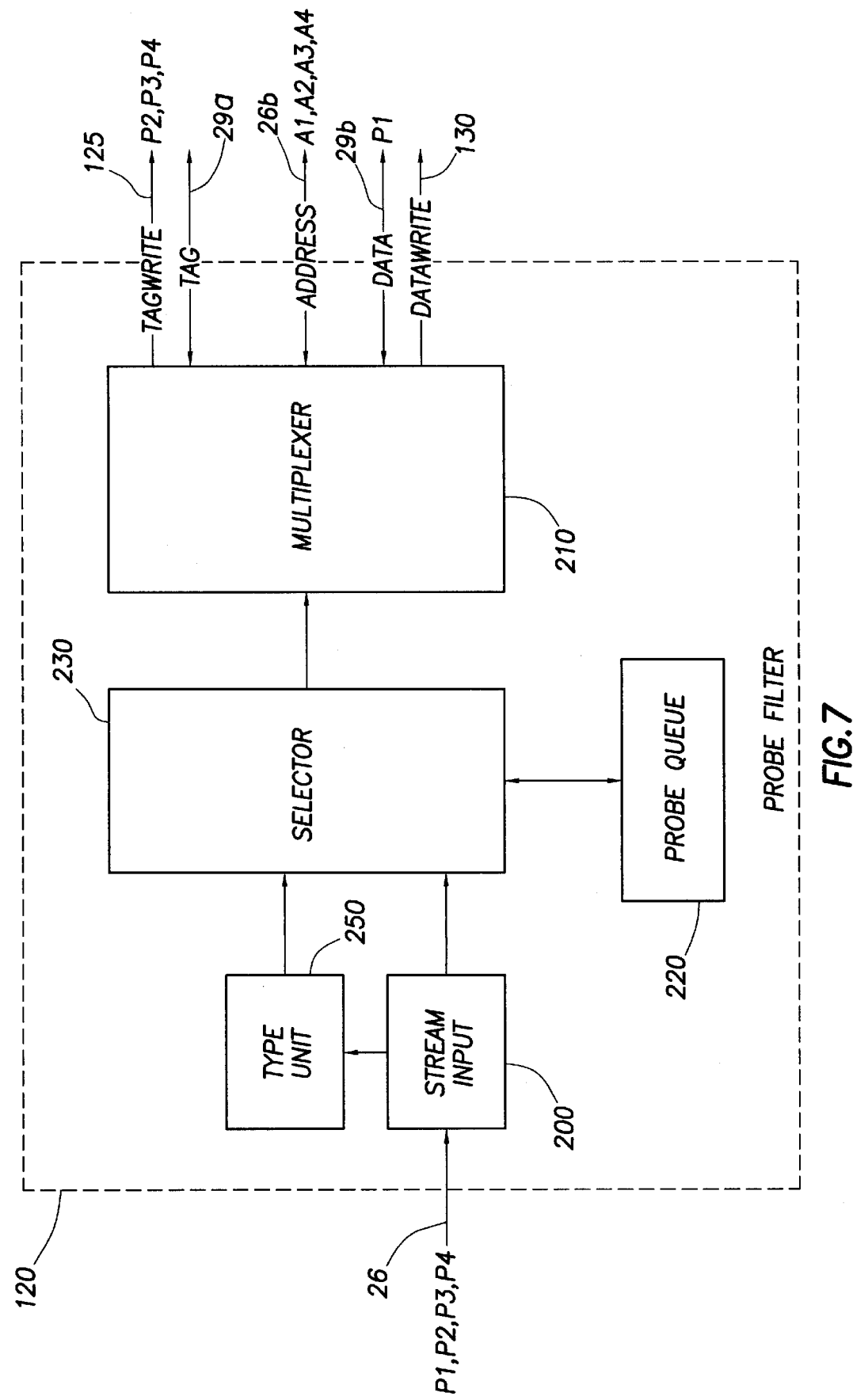
FIG. 7 discloses a third embodiment of the probe filter according to the present invention.

FIG. 7 shows a third embodiment of the probe filter 120 of FIG. 4, including the type unit 250. The type unit 250 is configured to determine from characteristics of the probe itself, whether to classify the probe as a tag-only probe or a full probe. For example, an I/O DMA probe from a graphics device is likely to be a cache hit. Thus, for this situation, the type unit would recognize a I/O DMA probe and force that probe to be a full probe. The type unit provides a mechanism to predict in advance whether a probe will hit or miss and to schedule the probe to reduce latency and bandwidth. In the case where the type unit detects an I/O DMA probe, The type unit 250 monitors the stream input 200 and forwards this information to selector 230. Selector 230 then selects all probes of type I/O DMA to be full-probes.

Figure 8:
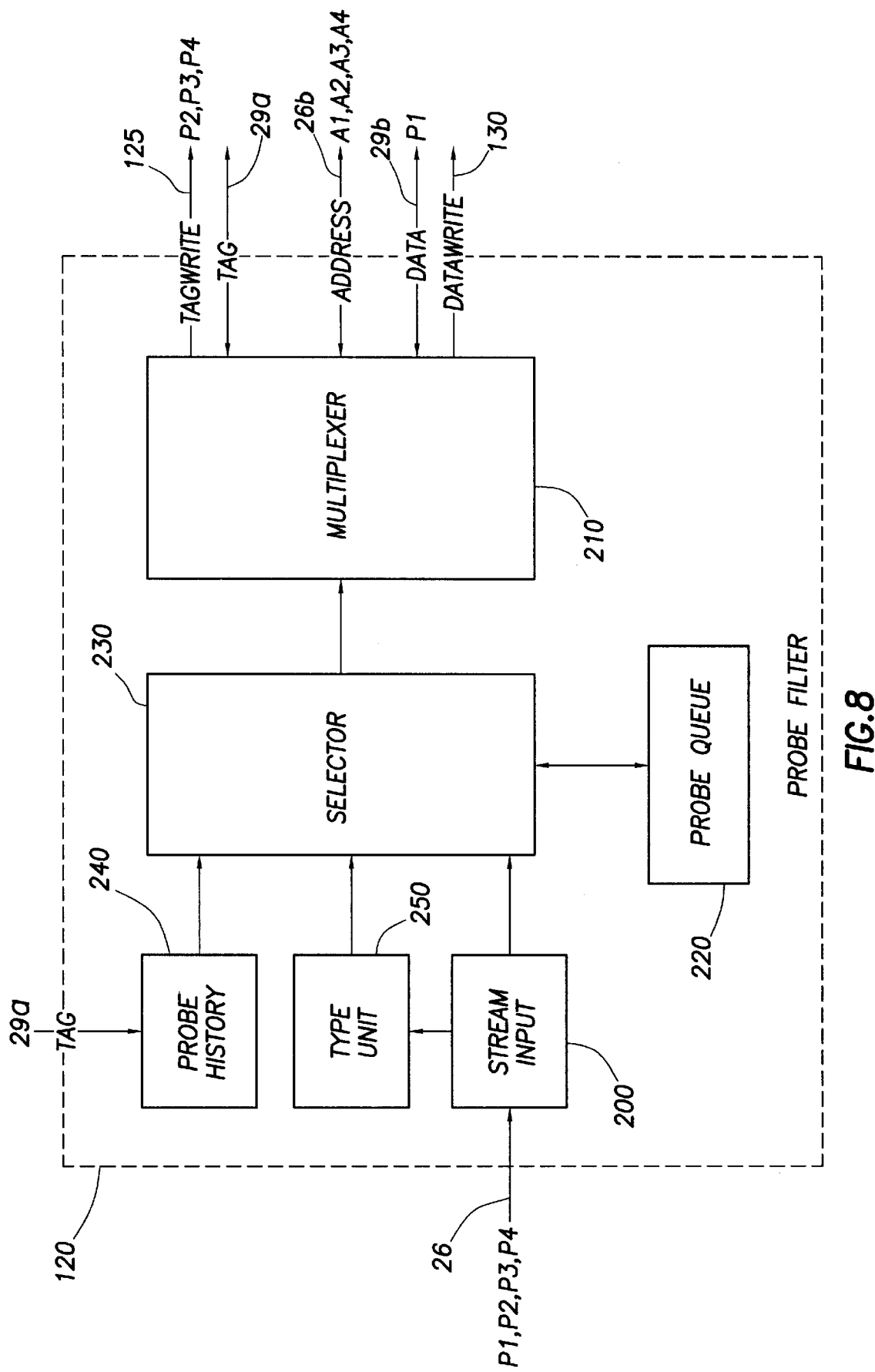
FIG. 8 discloses a fourth embodiment of the probe filter according to the present invention.

FIG. 8 shows a fourth embodiment which includes the multiplexer 210, selector 230, type unit 250 and probe history 240. In the fourth embodiment, the selector 230 provides circuitry for deciding a probe type for the probe, i.e. full-probe or tag-only probe, based on any combination of information, including information received from the probe history 240, type unit 250, and probe queue 220. Thus, specific optimizations can be implemented by building a response into the probe filter which. adopts to stream input patterns and probe types.

What is claimed is:

1. A computing apparatus for multiplexing a full probe with a plurality of tag-only probes, comprising:

a clock producing a plurality of clock cycles;
a cache comprising:
a tag structure which in response to a probe transfers tag information in a clock cycle;
a data structure which in response to a probe transfers data during multiple clock cycles of the plurality of clock cycles;
an input stream configured to accept a plurality of probes directed to cache;
a selector configured to designate each one of the plurality of probes in the input stream to be one of a full probe and a tag-only probe; and
a multiplexer configured to access the data structure with one of the probes designated a full probe to transfer data during the multiple clocks cycles, and the multiplexer further configured to access the tag structure with one or more of the probes designated tag-only probes during the multiple clock cycles, each one of the tag-only probes accessing the tag structure to transfer tag information during a respective one of the multiple clock cycles;
wherein a probe from the input stream accesses the cache in two stage wherein in the first stage the selector designates the probe to be a tag-only probe and the multiplexer accesses the tag structure with the probe and if the probe returns tag information indicating a cache hit the selector in the second stage designates the probe to be a full probe and the multiplexer then accesses the data structure with the probe.

2. The computing apparatus of claim 1,
wherein if the probe returns tag information indicating a cache miss the probe does not proceed to the second stage.

3. A computing apparatus for multiplexing a full probe with a plurality of tag-only probes, comprising:

a clock producing a plurality of clock cycles;
a cache comprising:
a tag structure which in response to a probe transfers tag information in a clock cycle;
a data structure which in response to a probe transfers data during multiple clock cycles of the plurality of clock cycles;
an input stream configured to accept a plurality of probes directed to cache;
a selector configured to designate each one of the plurality of probes in the input stream to be one of a full probe and a tag-only probe;
a multiplexer configured to access the data structure with one of the probes designated a full probe to transfer data during the multiple clocks cycles, and the multiplexer further configured to access the tag structure with one or more of the probes designated tag-only probes during the multiple clock cycles, each one of the tag-only probes accessing the tag structure to transfer tag information during a respective one of the multiple clock cycles;
a probe queue for storing probes; and
wherein the selector designates the proben from the input stream in two stages wherein in the first stage the selector designates the probe the input stream to be a tag-only probe, and, if the probe in response to an access to the tag structure returns tag information indicating a cache hit, the probe is put on a probe queue, and in the second stage the selector further designates the probe from the probe queue to be a full probe so that the multiplexer accesses the data structure with the probe.

4. A computing apparatus for multiplexing a full probe with a plurality of tag-only probes, comprising:

a clock producing a plurality of clock cycles;
a cache comprising:
a tag structure which in response to a probe transfers tag information in a clock cycle;
a data structure which in response to a probe transfers data during multiple clock cycles of the plurality of clock cycles;
an input stream configured to accept a plurality of probes directed to cache;
a selector configured to designate each one of the plurality of probes in the input stream to be one of a full probe and a tag-only probe; and
a multiplexer coupled to said cache via independent tag structure and data structure select signals and configured to access the data structure with one of the probes designated a full probe to transfer data during the multiple clocks cycles, and the multiplexer further configured to access the tag structure with one or more of the probes designated tag-only probes during the multiple clock cycles, each one of the tag-only probes accessing the tag structure to transfer tag information during a respective one of the multiple clock cycles;
wherein the multiple clock cycles equals four;
the selector is configured to designate one probe in the input stream to be a full probe and three probes in the input stream to be tag-only probes; and the multiplexer is configured to access the data structure corresponding to the full probe to transfer data during the four clocks, and the multiplexer is further configured to access the tag structure in a clock cycle of the multiple clock cycles corresponding to each one of the tag-only probes during three clock cycles of the four clock cycles.

5. A computing apparatus for multiplexing a full probe with a plurality of tag-only probes, comprising:
   a clock producing a plurality of clock cycles;
   a cache comprising:
      a tag structure which in response to a probe transfers tag information in a clock cycle;
      a data structure which in response to a probe transfers data during multiple clock cycles of the plurality of clock cycles;
      an input stream configured to accept a plurality of probes directed to cache;
      a selector configured to designate each one of the plurality of probes in the input stream to be one of a full probe and a tag-only probe; and
      a multiplexer configured to access the data structure with one of the probes designated a full probe to transfer data during the multiple clocks cycles, and the multiplexer further configured to access the tag structure with one or more of the probes designated tag-only probes during the multiple clock cycles, each one of the tag-only probes accessing the tag structure to transfer tag information during a respective one of the multiple clock cycles;
   a tag bus receiving a tag stream of tag information from the tag structure in responese to the corresponding plurality of probes; and
   a probe history counter having values 0 through 3 and wherein upon detecting a cache hidt from the tag stream the probe history counter is set to the value 3 and upon detecting a miss from the tag stream the probe history counter is determined by 1 and if a miss is detected while the probe history counter has value 0 then the probe history counter remains at 0; amd
   wherein the selector selects a probe to be a tag-only probe if the probe history counter is 0 and a full probe if the probe history counter is other than 0.

6. A method of probing a cache having a tag structure and data structure, comprising:
   forming an input stream of a plurality of probes directed to the cache;
   selecting each one of the plurality of probes in the input stream to be one of a full probe and a tag-only probe;
   accessing the data structure with one of the probes designated a full probe to transfer data during multiple clocks cycles of a clock; and
   accessing the tag structure with one or more of the probes designated tag-only probes during the multiple clock cycles, each one of the tag-only probes accessing the tag structure to transfer tag information during one of the multiple clock cycles;
   wherein each one of the plurality of probes from the input stream are designated as tag-only probes and after accessing the tag structure if the response for the one of the probes indicates a cache hit; then
   further comprising:
      storing the one of the probes indicating a cache hit on a probe queue;
      selecting each one of the probes on the probe queue to be a full probe; and
      accessing the data structure with each one of the probes on the probe queue.

7. A method of probing a cache having a tag structure and data structure, comprising:
   forming an input stream of a plurality of probes directed to the cache;
   selecting each one of the plurality of probes in the input stream to be one of a full probe and a tag-only probe;
   accessing the data structure with one of the probes designated a full probe to transfer data during multiple clocks cycles of a clock; and
   accessing the tag structure with one or more of the probes designated tag-only probes during the multiple clock cycles, each one of the tag-only probes accessing the tag structure to transfer tag information during one of the multiple clock cycles;
   receiving a tag stream of tag information responses from the tag structure in response to the corresponding plurality of probes;
   setting a counter upon detecting a cache hit from one of the responses of the tag stream to the value of 3 and upon detecting a miss from one of the responses of the tag stream decrementing the counter by 1 and if a miss is detected while the counter has a value 0 then keeping the counter at 0; and
   wherein in the selecting step a probe from the input stream is selected to be a tag-only probe if the counter is 0 and a full probe if the counter is not 0.

8. A multiprocessor system for resolving probes, comprising:
   a main memory configured to store information;
   memory controller, coupled to the main memory; and
   a plurality of processors, each processor coupled to the memory controller, a first one of the processors including:
      a clock producing a plurality of clock cycles; a cache comprising:
         a tag structure which in response to a probe transfers tag information in a clock cycles;
         a data structure which in response to a probe transfers data during multiple clock cycles of the plurality of clock cycles;
         an input stream configured to accept a plurality of probes directed to the cache;
         a selector configured to designate each one of the plurality of probes in the input stream to be one of a full probe and a tag-only probe; and
         a multiplexer configured to access the data structure with one of the probes designated a full probe to transfer data during the multiple clocks cycles, and the multiplexer further configured to access the tag structure with one or more of the probes designated tag-only probes during the multiple clock cycles, each one of the tag-only probes accessing the tag structure to transfer tag information during a respective one of the multiple clock cycles;
      wherein the selector selects the probe from the input stream in two stages wherein in the first stage the selector selects the probe to be a tag-only probe and only if the probe returns tag information indicating a cache hit the selector in the second stage selects the probe to be a full probe.

9. A multiprocessor system for resolving probes, comprising:

a main memory configured to store information;

memory controller, coupled to the main memory; and a plurality of processors, each processor coupled to the memory controller, a first one of the processors including:

a clock producing a plurality of clock cycles; a cache comprising:

a tag structure which in response to a probe transfers tag information in a clock cycles;

a data structure which in response to a probe transfers data during multiple clock cycles of the plurality of clock cycles;

an input stream configured to accept a plurality of probes directed to the cache;

a selector configured to designate each one of the plurality of probes in the input stream to be one of a full probe and a tag-only probe; and a multiplexer configured to access the data structure with one of the probes designated a full probe to transfer data during the multiple clocks cycles, and the multiplexer further configured to access the tag structure with one or more of the probes designated tag-only probes during the multiple clock cycles, each one of the tag-only probes accessing the tag structure to transfer tag information during a respective one of the multiple clock cycles;

wherein the first processor further comprises:

a tag bus receiving a tag stream of tag information from the tag structure in response to the corresponding plurality of probes; and a probe history counter having values 0 through 3 and wherein upon detecting a cache hit from the tag stream the probe history counter is set to the value 3 and upon detecting a miss from the tag stream the probe history counter is decremented by 1 and if a miss is detected while the probe history counter has value 0 then the probe history counter remains at 0; and wherein the selector selects a probe to be a tag-only probe if the probe history counter is 0 and a full probe if the probe history counter is not 0.

* * * * *